H. M. LYMAN.
MOTOR VEHICLE BRAKE.
APPLICATION FILED MAY 20, 1909.
946,145.
Patented Jan. 11, 1910.
2 SHEETS—SHEET 1.
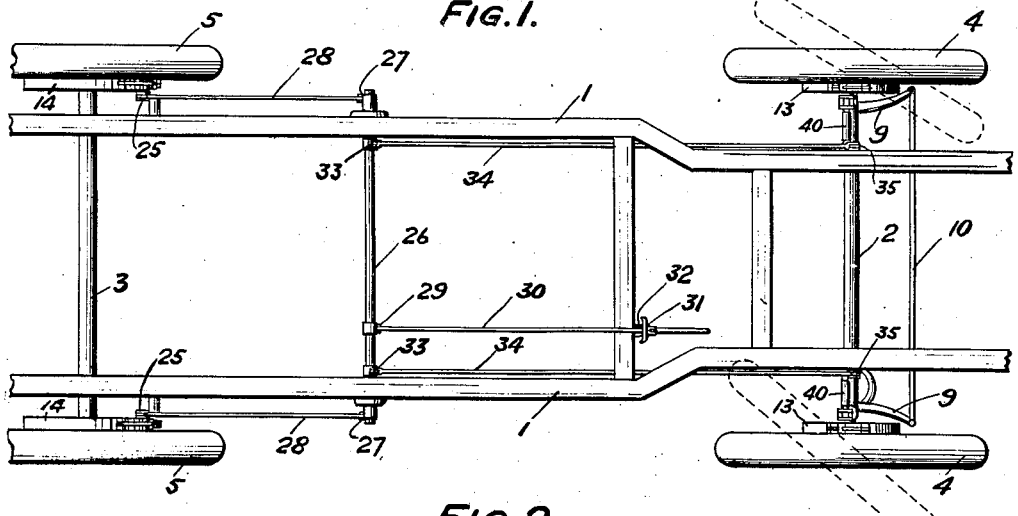
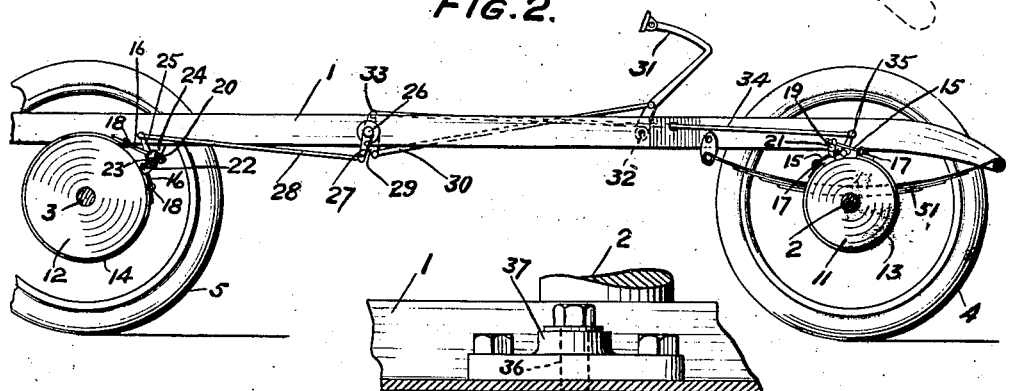
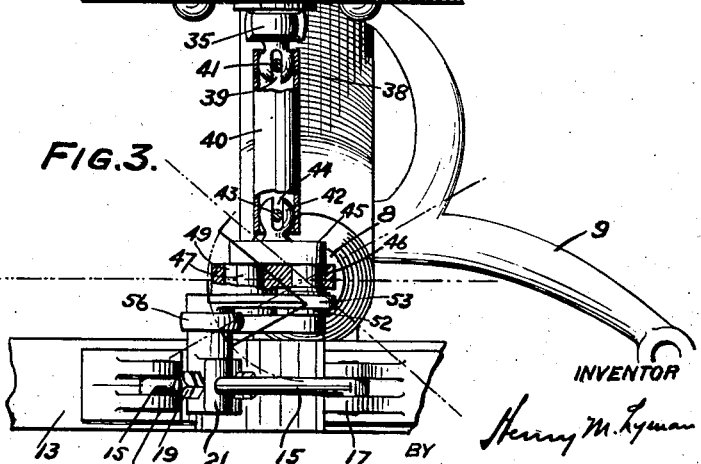
WITNESSES:
INVENTOR
Henry M. Lyman
BY
Charles N. Butler
ATTORNEY.

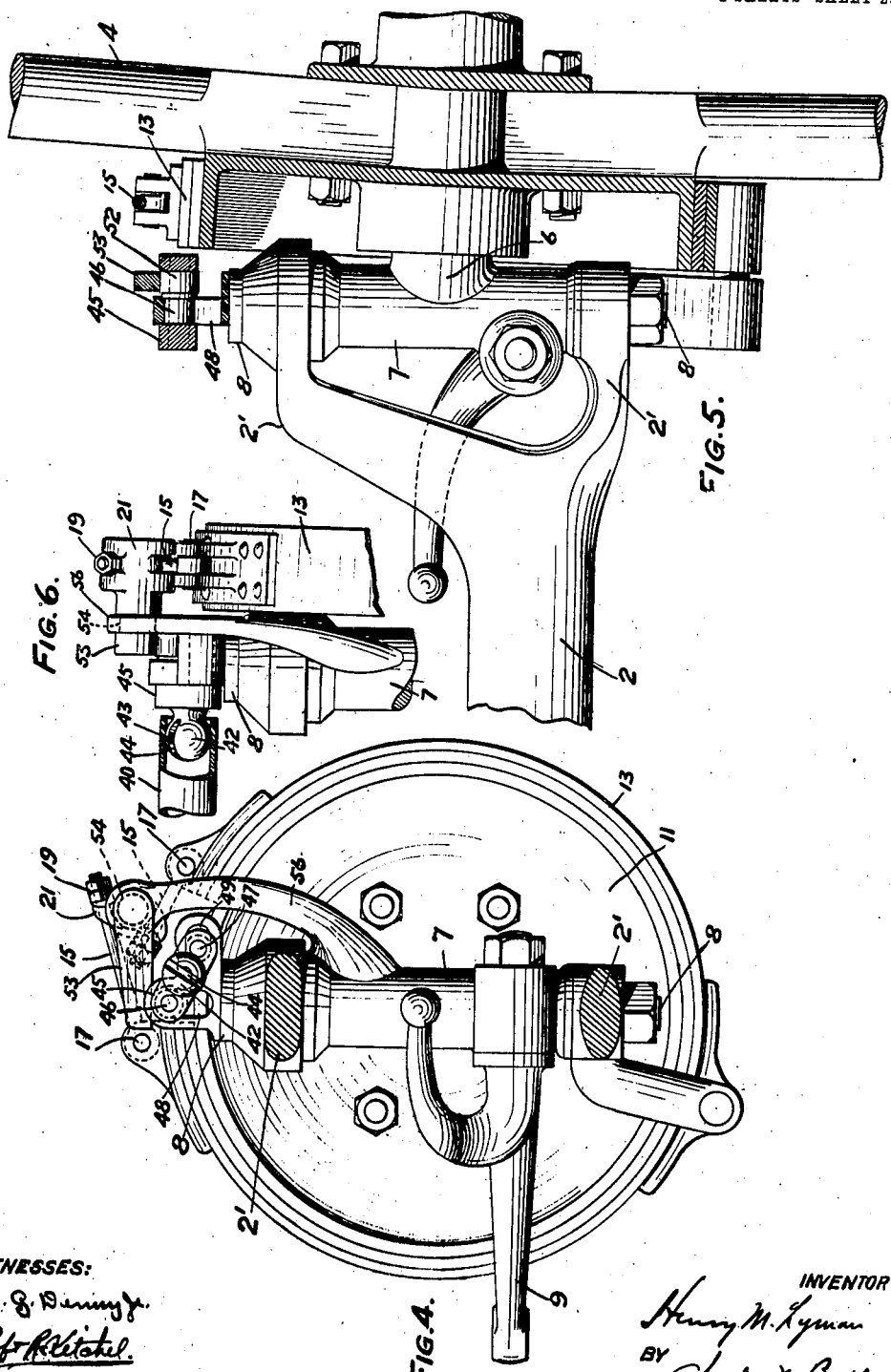

UNITED STATES PATENT OFFICE.

HENRY M. LYMAN, OF PHILADELPHIA, PENNSYLVANIA.

MOTOR-VEHICLE BRAKE.

946,145.     Specification of Letters Patent.     Patented Jan. 11, 1910.

Application filed May 20, 1909. Serial No. 497,341.

*To all whom it may concern:*

Be it known that I, HENRY M. LYMAN, a citizen of the United States, residing in the city of Philadelphia, county of Philadelphia, and State of Pennsylvania, have invented certain Improvements in Motor-Vehicle Brakes, of which the following is a specification.

My invention is a motor vehicle brake adapted for holding all the wheels by means compensating for variations between wheels and frame and applying differential actions to the steering wheels, particularly by holding the inner harder than the outer wheel when turning a curve for the purpose of facilitating the operation of turning.

A further object is to apportion the braking action of the front and hind wheels to the load carried thereby for the purpose of equalizing the resistance throughout the structure in applying the brakes and avoiding shocks and strains.

The characteristic features of my improvements are disclosed in the following description and the accompanying drawings in illustration thereof.

In the form of my improvements illustrated in the drawings, Figure 1 is a plan view of an automobile truck having my improved braking mechanism applied thereto; Fig. 2 is a side elevation of the construction shown in Fig. 1; Fig. 3 is a sectional plan view showing the brake connections for a front wheel; Fig. 4 is an elevation of the brake connections for a front wheel; Fig. 5 is a sectional elevation taken through the connections parallel to the axle of a front wheel to which they are applied; Fig. 6 is a sectional elevation showing details at right angles to their position in Fig. 4.

The mechanism shown in the drawings comprises the frame 1, the front and rear axles 2 and 3 upon which the frame is supported and the front and rear wheels 4 and 5 connected with the respective axles. The front wheels 4 are journaled on spindles 6 having the usual steering knuckles 7 which are journaled on the bolts 8 fixed to the end bearings 2' of the front axles and turned by the arms 9 thereon connected by the rod 10. The respective front and rear wheels are provided with the usual drums 11 and 12 having thereon the brake bands 13 and 14 connected with links 15 and 16 by the pivots 17 and 18, the links being provided with the adjustable nuts 19 and 20 bearing upon opposite ends of the rocking levers 21 and 22. The levers 22 are fixed to journals 23 supported in any usual manner, as by the bearings 24, the journals having fixed thereto the arms 25.

A shaft 26, journaled in the frame, has fixed thereto the arms 27 which are connected by the rods 28 with the arms 25. This shaft has fixed thereto the further arm 29 which is connected by the rod 30 with the foot lever 31, the latter rocking on the bearing 32. The shaft 26 has fixed thereon the additonal arms 33 which are disposed oppositely to the arms 26 and connected by the rods 34 with arms 35, the latter being fixed to journals 36 which rock in the bearings 37 on the frame.

The journals 36, through which brake rods act, are provided with balls 38 containing the slots 39. Stub shafts 40 have their hollow inner ends sleeved on the balls and pins 41 pass through the shafts and the slots in the balls, whereby the balls and shafts turn together while the latter are capable of universal movement with relation to the former. The hollow outer ends of the shafts 40 are sleeved on balls 42 and pins 43 pass through the shaft and slots 44 in the balls whereby the shafts and these balls turn together while the latter are permitted universal movement with relation to the former. Balls 42 are fixed to cross heads 45 having thereon pins 46 and 47 which are movable in the transversely disposed slots 48 and 49 formed in the tops of the bolts 8. It will be seen that the cross heads 45 thus fixed to the front axle and the arms 35 journaled in the frame are flexibly connected through the stub shafts 40 so that the frame and axle, flexibly connected through springs 51, can move relatively to each other without disturbing the operations of the connections between the parts 35 and 45. Cross head pins 46, movable in the vertical ways 48, have thereon the rollers 52 and the rocking levers 21 have fixed thereto the arms 53 which rest on these rollers, the levers and arms being connected by journals 54 turning in bearings 56 carried by the knuckles 7.

It will be understood that the front wheels 4, connected through the outwardly bent arms 9 and the connecting rod 10, are moved simultaneously, through different arcs, in turning, the outer wheel being movable through an arc of say 30 degrees while the inner wheel moves through an arc of say 40 degrees. As the rollers 52 are disposed eccentrically to the axes of the knuckles or the vertical axes of oscillation of the front wheels, and as the axes of the journals 54 are by the disposition of the bearings 56 removed farther than the rollers from the axes of the knuckles, and turn about the axes, the distance between the horizontal axis of oscillation of the arms 53 and the bearings of such arms on the rollers will vary as the wheels turn about their vertical axes, such distance being a function of the arc through which the corresponding wheel has turned. Consequently when the brake is applied in the straight ahead movement of the wheels, the same braking effect is applied to each of the front wheels. But when the brake is applied while the front wheels are turned to round a curve, the outer will have the lighter braking force applied thereto since the rollers 52 are elevated to the same degree and the power arm of the outer lever 53 is longer than the power arm of the corresponding inner lever, and the desired differential actions of the outer and inner brake bands 13 will be obtained. In the preferred operation, the arms 53 are brought to substantially level positions in applying the brake and these positions may be obtained by adjusting the nuts 19.

In order that the rear wheels, which carry the larger portion of the load, shall have greater braking force applied thereto than the front wheels, I proportion the mechanism for applying the power to the front and rear friction drums, as for example by making the arm 27 longer than the arm 33, so that the rear drums shall be subject to greater friction than the front.

The distribution of the braking effect to the several wheels, particularly in the manner described, avoids or tends to avoid stopping the wheels and skidding as in brakes where the power is all applied to a pair of wheels.

Having described my invention, I claim:

1. The combination with a pair of steering wheels of devices for braking the respective wheels equally in a straight ahead movement and means whereby the actions of said devices are automatically differentiated in turning so that greater braking force is applied to the inner than to the outer wheel.

2. The combination of an axle, a pair of wheels, steering knuckles connecting said axle and wheels, means whereby said wheels are simultaneously turned about the axes of their respective knuckles through different angles, braking devices for the respective wheels, and mechanism whereby said devices are equally applied in the straight ahead movement of said wheels and differentially applied in the turning movement of said wheels.

3. The combination of an axle, a pair of wheels, steering knuckles connecting said axle and wheels, means whereby said wheels are simultaneously turned about the axes of their respective knuckles, braking devices for the respective wheels, arms having axes of revolution removed from the axes of revolution of said knuckles for operating said arms, and reciprocating means for operating said arms, said arms having movable points of contact with said means.

4. The combination of an axle, a pair of wheels, steering knuckles connecting said axle and wheels, braking devices for the respective wheels, rocking arms for operating said devices, rocking devices for operating said arms, and actuating means comprising rocking arms and flexible connections between said last named arms and devices.

In witness whereof I have hereunto set my name this 19th day of May, 1909, in the presence of the subscribing witnesses.

HENRY M. LYMAN.

Witnesses:
ROBERT JAMES EARLEY,
JOS. G. DENNY, Jr.